Patented Apr. 7, 1925.

1,532,361

UNITED STATES PATENT OFFICE.

JEAN ALTWEGG, OF LYON, FRANCE, ASSIGNOR TO SOCIETE CHIMIQUE DES USINES DU RHONE, OF PARIS, FRANCE.

PROCESS FOR THE PREPARATION OF ALKYLAMINE SALTS OF THE 4-HYDROXY-3-ACYL-AMINO-PHENYLARSONIC ACIDS.

No Drawing.     Application filed February 29, 1924. Serial No. 696,085.

*To all whom it may concern:*

Be it known that I, JEAN ALTWEGG, residing at Lyon, France, a citizen of the Confederation of Switzerland, have invented certain new and useful Improvements in Processes for the Preparation of Alkylamine Salts of the 4-Hydroxy-3-Acylamino-Phenylarsonic Acids, of which the following is a specification.

In the treatment of certain infectious diseases, such as sleeping sickness and syphilis, use is made of phenylarsonic acids substituted in the benzene nucleus. Generally speaking, the treatment consists in sub-cutaneous injections. The acids of the amino phenylarsonic group being insoluble in water, recourse is had to their sodium salts, which readily dissolve in water.

Quite recently, it has been recognized that the 4-hydroxy-3-acylamino-phenylarsonic acids possess particularly interesting therapeutic properties, but the weak solubility of their sodium salts in water was an obstacle to the preparation of these salts. For instance, by observing certain precautions, it is possible to prepare a solution of about 10 per cent of sodium 4-hydroxy-3-acetylamino-phenylarsonate, but it is only a pseudo-solution which, after a certain lapse of time, deposits heavy crystals of an almost insoluble hydrated salt. Such solutions cannot therefore be employed. On the other hand, by replacing the sodium salts by potassium or lithium salts, more concentrated solutions are obtained, but these solutions, when injected in a higher organism, have very serious toxic effects.

I have found that 4-hydroxy-3-acylamino-phenylarsonic acids form with alkylamines well defined mono-basic salts, which can be purified by recrystallization and give with water concentrated solutions having a strictly neutral reaction. These solutions are very stable and may be sterilized without decomposing. I have besides ascertained the quite unexpected fact that these organic salts of amines are perfectly inocuous to higher organisms, even at stronger doses than the sodium salts.

Besides, the injection of these solutions is painless, even when they are concentrated. The therapeutic effect of the free acids is preserved in its entirety.

These salts may be prepared by mixing the free acid and the amine in equimolecular proportions in the presence of a solvent. They can, for instance, be prepared by dissolving the acid in an aqueous or an alcoholic solution of the amine.

As an example of the above salts may be mentioned the monobasic diethylamine 4-hydroxy-3-acetylamino-phenylarsonate, which occurs under the form of brilliant colourless crystals, soluble in water at 10° C., to a concentration of about 30%, and the monobasic monoethyl amine 4-hydroxy-3-formylamino-phenylarsonate, obtained under the form of a crystalline powder, susceptible to recrystallization in alcohol and soluble in water to a concentration exceeding 50%.

4-hydroxy-3-acylamino phenylarsonic acid is described in Jour. Amer. Chem. Soc., 1921, volume 43, page 583, and volume 44, page 2340.

The structural formula of the products obtained is as follows:

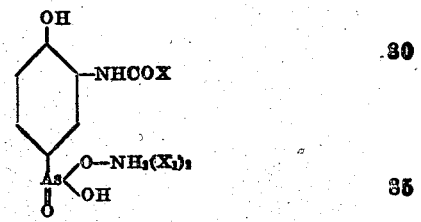

What I claim and desire to secure by Letters Patent is:—

1. A process for the preparation of alkylamine salts of 4-hydroxy-3-acylamino-phenylarsonic acids, consisting in the combination of these acids with alkylamines.

2. Process for the preparation of alkylamine salts of 4-hydroxy-3-acylamino-phenylarsonic acids, as claimed in claim 1, characterized in that the combination is effected by mixing in equimolecular proportions the free acid and the alkylamine in the presence of a solvent and evaporating the solvent to obtain the crystallized salt soluble in water.

3. Process for the preparation of alkylamine salts of 4-hydroxy-3-acylamino-phenylarsonic acids, as claimed in claim 1, characterized in that the combination is effected by dissolving the acid in an aqueous solution of the amine.

4. As new products, the alkylamine salts of 4-hydroxy-3-acylamino-phenylarsonic acids.

In testimony whereof I affix my signature.

JEAN ALTWEGG.